United States Patent [19]

Yabumoto et al.

[11] Patent Number: 5,510,019
[45] Date of Patent: Apr. 23, 1996

[54] BUBBLE SEPARATING APPARATUS

[75] Inventors: Junsuke Yabumoto, Atsugi; Masanori Hirose, Kawasaki, both of Japan

[73] Assignee: Mitsubishi Oil Co., Ltd., Tokyo, Japan

[21] Appl. No.: 280,941

[22] Filed: Jul. 27, 1994

[30] Foreign Application Priority Data

Jul. 30, 1993 [JP] Japan .................................. 5-190440
Feb. 22, 1994 [JP] Japan .................................. 6-046601

[51] Int. Cl.⁶ ........................ B01D 17/12; B01D 17/038; B01D 19/00
[52] U.S. Cl. .................. 210/137; 55/459.5; 96/174; 96/209; 96/212; 210/188; 210/512.1
[58] Field of Search ........................ 96/174, 177, 209, 96/208, 212; 55/459.1, 459.4, 459.51; 210/97, 137, 188, 512.1, 788, 512.2

[56] References Cited

U.S. PATENT DOCUMENTS

| | | | |
|---|---|---|---|
| 3,747,306 | 7/1973 | Wikdahl | 210/512.1 |
| 3,771,290 | 11/1973 | Stethem | 210/512.1 |
| 4,390,351 | 6/1983 | Matsui et al. | 210/512.1 |
| 4,997,556 | 3/1991 | Yano et al. | 210/512.1 |

FOREIGN PATENT DOCUMENTS

| | | | |
|---|---|---|---|
| 507584 | 10/1992 | European Pat. Off. | 96/209 |
| 5-84403 | 4/1993 | Japan | 96/209 |
| 734460 | 8/1955 | U.S.S.R. | 210/512.1 |
| 1426613 | 9/1988 | U.S.S.R. | 96/209 |
| 93/12889 | 7/1993 | WIPO | 96/177 |

*Primary Examiner*—Joseph W. Drodge
*Attorney, Agent, or Firm*—Barnes & Thornburg

[57] ABSTRACT

A vortical flow type bubble separating apparatus comprises a container defining a substantially cone-shaped vortical flow chamber having a lower larger diameter end with a plurality of holes, an outer casing for receiving a liquid discharged from the vortical flow chamber through the holes, a center conduit pipe with a plurality of orifices for removing bubble containing fraction from the vortical flow chamber for discharging, an annular preliminary vortical flow passage extending at least approximately entire circumference of the larger diameter end portion of the container, a single opening defined through the peripheral wall of the vortical flow chamber and communicating the vortical flow chamber and the preliminary vortical flow passage, the opening being designed for introducing the liquid into the vortical flow chamber from the preliminary vortical flow passage in substantially tangential direction to the vortical flow chamber, and a flow guide member provided at the end of the preliminary vortical flow passage in the vicinity of the opening for guiding the liquid flow into the vortical flow chamber with little angular deflection.

19 Claims, 6 Drawing Sheets

BUBBLE SEPARATING APPARATUS

BACKGROUND OF THE INVENTION

1. Field of the Invention

The present invention relates generally to a bubble separating apparatus for removing bubbles contained in a liquid, such as lubricants, surface active agents, polymer containing liquid, coating and so forth. More specifically, the invention relates to a bubble separating apparatus which can effectively remove even fine bubbles by a vortical flow created with utilizing flow of the liquid per se.

2. Description of the Related Art

Fine bubbles dispersed in a liquid are known to influence natural properties or performance of the liquid or to be a factor promoting oxidation of the liquid.

For example, engine oils, turbine oils, hydraulic oils and so forth, may contain a large amount of fine bubbles generated due to agitation, circulation, abrupt pressure variation and the like. The amount of fine bubbles increases with the higher speeds and higher outputs according to progress of technologies of engines, turbines, and hydraulic equipment. A large amount of fine bubbles contained in the lubricants tend to cause vibration or abnormal noise in a supply pump, wearing of the vibrating portion, lowering of working pressure and/or working efficiency due to a drop in hydraulic pressure and so forth. Furthermore, increased contact area between the liquid and the fine bubbles promotes degradation of the liquid due to oxidation.

In case of the coating, the fine bubbles contained in the coating may adhere on the surface where a coating layer is to be formed, preventing the coating from being applied thereto and causing irregularity or other defect in the coating layer.

Therefore, it has been required to effectively remove bubbles from liquid.

As a typical bubble separating apparatus, there has been an apparatus which utilizes a flow of the liquid pressurized by a pump to generate a vortical flow of the liquid to concentrate bubbles at the center portion of the vortical flow due to centrifugal force, whereby efficiently and certainly to remove bubbles from the liquid. Commonly owned Japanese Unexamined Patent Publication (Kokai) No. 3-123605 discloses such bubble separating apparatus. The construction of the prior proposed bubble separating apparatus disclosed in the above-identified publication will be discussed briefly with reference to FIG. 1.

In FIG. 1, a vortical flow chamber 2 is defined by a parabola-shaped container 1 having opposite closed ends. In the shown example, the parabola-shaped container 1 is arranged vertically with the larger diameter end. The larger diameter end of the container 1 is surrounded by an annular pipe 3 which is formed integrally with the container 1. A liquid supply inlet 4 is connected to the annular pipe 3. A plurality of openings 5 are formed through the peripheral wall of the upper larger diameter end of the container 1 at intervals for establishing communication between the annular pipe 3 and the vortical flow chamber 2 defined in the container 1. The liquid is supplied from the liquid supply inlet 4 into the annular pipe 3 to circulate therealong and flows into the chamber 2 through the openings 5 to generate vortical flow therein.

The container 1 has a plurality of small holes 6 formed through the peripheral wall in substantially a lower half of the container. The container 1 is disposed in an outer vessel 8 so that the liquid discharged through the holes 6 is received within the outer vessel 8. The outer vessel 8 is formed integrally with the container 1 and the annular pipe 3. The liquid received in the outer vessel 8 is discharged through a liquid discharge outlet 7.

On the other hand, along the center axis of the vortical flow chamber 2 in the container 1, a center conduit pipe 9 is disposed. The center conduit pipe 9 is formed with a plurality of orifices 10 for communicating with the chamber 2. The lower end of the center conduit pipe 9 extends from the lower end of the container 1 and the bottom of the outer vessel 8. The center conduit pipe 9 is adapted to capture bubbles concentrated toward the center portion by centrifugal force exerted due to vortical flow of the liquid within the chamber 2. The bubble containing liquid flowing into the center conduit pipe 9 through the orifices 10 is fed to a bubble discharge outlet 11.

The openings 5 connecting the interior space of the annular pipe 3 and the chamber 2 are formed into such a configuration as to lead the liquid into the chamber 2 along a tangential direction thereof. The openings 5 may be formed by a punch press to provide a guide wall extending inwardly of the chamber 2.

The liquid introduced into the chamber 2 flows in a tangential direction to generate a vortical flow. As is well known, due to centrifugal force, the bubble-rich liquid is then concentrated in the center portion of the vortical flow and fine bubbles are combined together to form greater size bubbles. The liquid containing less bubbles concentrates in the vicinity of the peripheral wall of the chamber 2, where it is discharged through the holes 6 into the outer vessel 8 and then through the liquid discharge outlet 7. On the other hand, the bubble component concentrated at the center portion of the vortical flow enters into the center conduit pipe 9 and is discharged through the bubble discharge outlet 11.

It is to be noted here that bubble separation performance utilizing centrifugal force of the vortical flow is proportional to the square of the liquid flow velocity and inversely proportional to the radius of the chamber 2. Namely, at a position where the radius of the chamber is r, when a liquid having a density $\rho 1$ and bubbles having a density $\rho g$ flows at a flow velocity v and an angular velocity $\omega$, the liquid-bubble separation performance S can be expressed by the following equation:

$$S = (\rho 1 - \rho g) \times \omega^2 \times r$$

Here, since $\omega$ can be expressed by v/r, the foregoing equation can be modified as:

$$S = (\rho 1 - \rho g) \times v^2 / r$$

As seen from FIG. 1, since the vortical flow chamber 2 is constructed to have reduced radius (r) toward its lower portion, the bubble separation performance S becomes greater toward the lower portion.

The inventors herein have found that the shown type of the bubble separating apparatus is more effective for greater size bubbles. To enlarge the bubble size by combining a plurality of fine bubbles, a substantially strong vortex with laminar flow is required to be generated. The known apparatus is not considered sufficient from this viewpoint, because the annular pipe 3 communicating with the chamber 2 through a plurality of spaced openings 5, does not contribute to the generation of vortical flow. The liquid stream in the annular pipe 3 is a turbulent flow so that the fine bubbles contained in the liquid are not united together. Thus, the bubble separation is substantially solely achieved by the vortical flow in the chamber 2.

SUMMARY OF THE INVENTION

Therefore, it is a general object of the present invention to provide a vortical flow type bubble separating apparatus which is more efficient in removing a bubble component from a liquid with stronger vortical flow.

Another object of the present invention is to provide a vortical flow type bubble separating apparatus which may cause combining of fine bubbles to form greater size bubbles before a liquid is introduced into a vortical flow chamber and thus improve the efficiency of removal of bubbles.

A further object of the present invention is to provide a vortical flow type bubble separating apparatus which may provide a laminar flow of a bubble containing liquid prior to the bubble containing liquid entering into a vortical flow chamber to enhance a vortex in the chamber for improving the efficiency of removal of bubbles.

A still further object of the present invention is to provide a vortical flow type bubble separating apparatus which is simple in construction and compact in size with satisfactorily high bubble removing performance.

According to one aspect of the invention, a vortical flow type bubble separating apparatus comprises:

- a container having a circular cross-section, a predetermined axial length and closed axial ends, the container defining a substantially cone-shaped vortical flow chamber having a lower larger diameter end;
- a plurality of holes formed in a predetermined regions in the vicinity of the upper half of the peripheral wall of the container for discharging a reduced bubble fraction of a liquid from the chamber;
- an outer casing surrounding the container and receiving the liquid discharged from the chamber through the holes for guiding the received liquid to an outlet;
- a center conduit pipe disposed within the chamber and extending substantially along the center axis of the chamber;
- a plurality of orifices formed through the center conduit pipe within the chamber for removing a bubble containing fraction from the chamber for discharging;
- an annular preliminary vortical flow passage extending at least approximately the entire circumference of the larger diameter end portion of the container;
- a single opening defined through the peripheral wall of the container and connecting the chamber and the preliminary passage, the opening being provided at one end of the preliminary passage and designed for introducing the liquid into the chamber from the preliminary passage in a substantially tangential direction to the chamber; and
- a flow guide member provided at the end of the preliminary passage in the vicinity of the opening for guiding the liquid flow into the chamber with little angular deflection.

In the preferred construction, the apparatus may further comprise a liquid supply regulation mechanism responsive to a pressure difference between a liquid pressure at an inlet of the preliminary passage and a liquid pressure in the chamber for regulating a flow velocity of the liquid as introduced into the chamber.

The container, the outer casing and the preliminary passage may be integrated. The preliminary passage may be connected at the other end thereof to a pressurized liquid source for introducing a pressurized liquid in a substantially tangential direction.

In the preferred construction, the liquid supply regulation mechanism comprises a member movable relative to the single opening for restricting a liquid flow area thereof and thereby adjusting the liquid flow area depending upon the pressure difference between the chamber and the inlet of the preliminary passage in order to regulate flow velocity of the liquid introduced into the chamber.

According to another aspect of the invention, a vortical flow type bubble separating apparatus comprises:

- a cyclone for generating a vortical flow of a liquid for separating bubbles contained in the liquid by centrifugally concentrating a first fraction of the liquid containing substantially no bubble and a second fraction of the liquid containing concentrated bubbles, the cyclone having a plurality of holes formed through a peripheral wall thereof for discharging the first fraction of the liquid therethrough and an inlet for introducing a pressurized liquid into the cyclone;
- an induction assembly communicating at one end thereof with the inlet of the cyclone and at the other end thereof with a pressurized liquid source, for introducing the pressurized liquid into the cyclone therethrough, the induction assembly incorporating means exerting a centrifugal force on the liquid flowing therethrough for preliminarily separating the first and second fractions of the liquid and forming laminar flows of respective fractions, and means for deflecting the laminar flows of the liquid toward the inlet with little angular deflection to introduce the liquid as a tangential flow at the inlet of the cyclone;
- a center conduit means disposed in the cyclone and extending substantially along the center axis of the cyclone, the center conduit means having a plurality of orifices for removing the second fraction of the liquid and discharging it; and
- an outer casing surrounding the cyclone for receiving the first fraction of the liquid discharged through the holes of the peripheral wall of the cyclone, the outer casing having an outlet for discharging the first fraction of the liquid.

The induction assembly may have an inlet connected to the pressurized liquid source via a supply line and an outlet communicating with the cyclone, the inlet and the supply line being connected to orient the liquid substantially tangent with respect to the inlet of the induction assembly. Also, the means for preliminarily separating the first and second fractions of the liquid may comprise a passage portion extending circumferentially of the cyclone for guiding the flow of the liquid while causing centrifugal separation of the first and second fraction of the liquid. Preferably, the passage portion extends around substantially the entire circumference of the cyclone.

In the preferred construction, the apparatus further comprises a liquid flow velocity regulating means responsive to a pressure difference between the cyclone and the inlet of the induction assembly. The liquid flow velocity regulating means may comprise a member movable with respect to the inlet of the cyclone for varying a liquid path area depending upon the pressure difference between the cyclone and the inlet of the induction assembly.

BRIEF DESCRIPTION OF THE DRAWINGS

The present invention will be understood more fully from the detailed description given herebelow and from the accompanying drawings of the preferred embodiments of the present invention.

In the drawings.

DESCRIPTION OF THE PREFERRED EMBODIMENTS

The present invention will be discussed hereinafter in detail with reference to FIGS. 2 to 6. In the following description, numerous specific details are set forth in order to provide a thorough understanding of the present invention. It will be obvious, however, to those skilled in the art that the present invention may be practiced without these specific details. In other instance, well-known structures are not shown in detail in order not to unnecessarily obscure the present invention.

Figure 2:
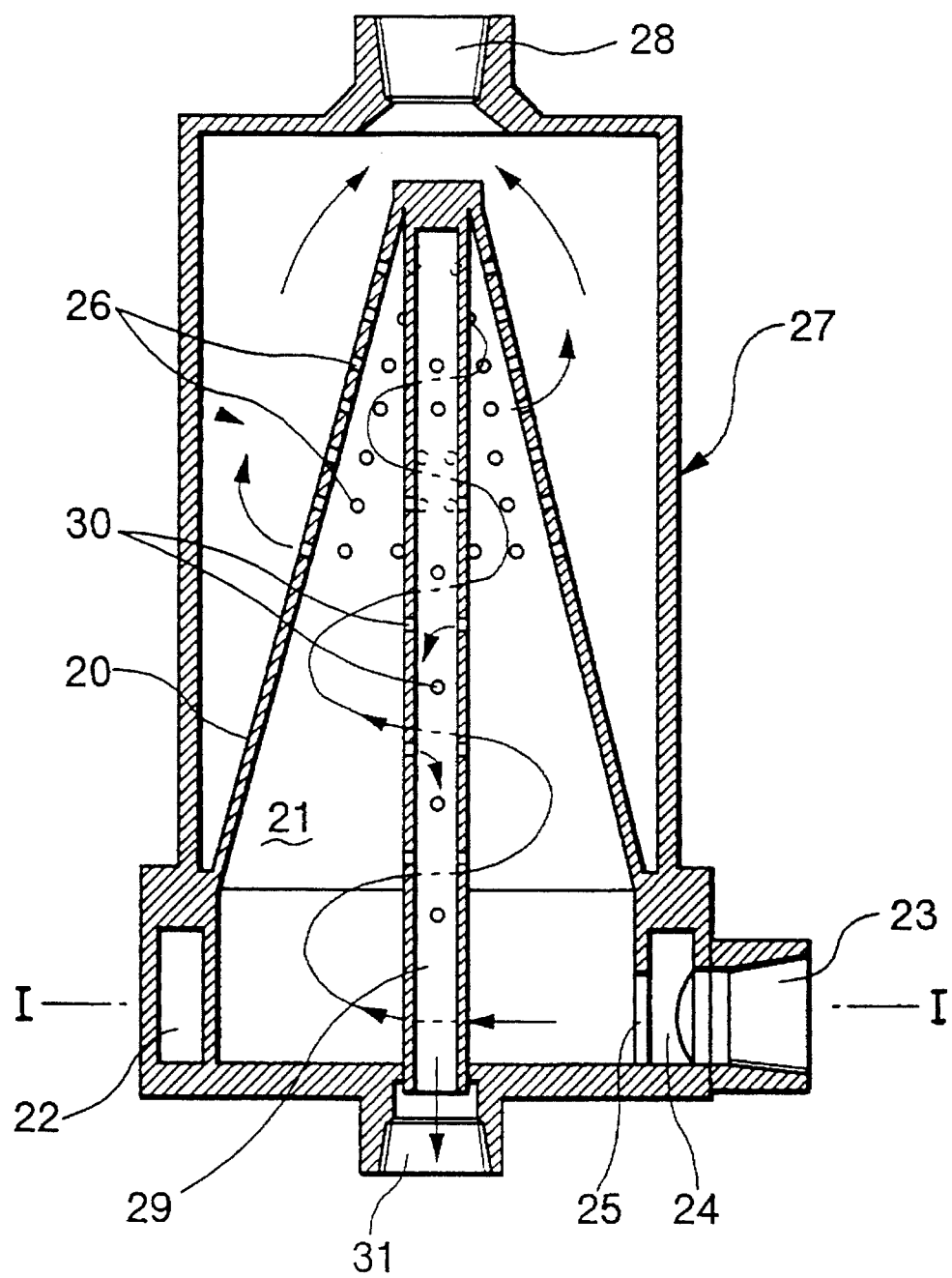
FIG. 2 is a sectional front elevation of a first embodiment of a bubble separating apparatus according to the present invention.
Figure 3:
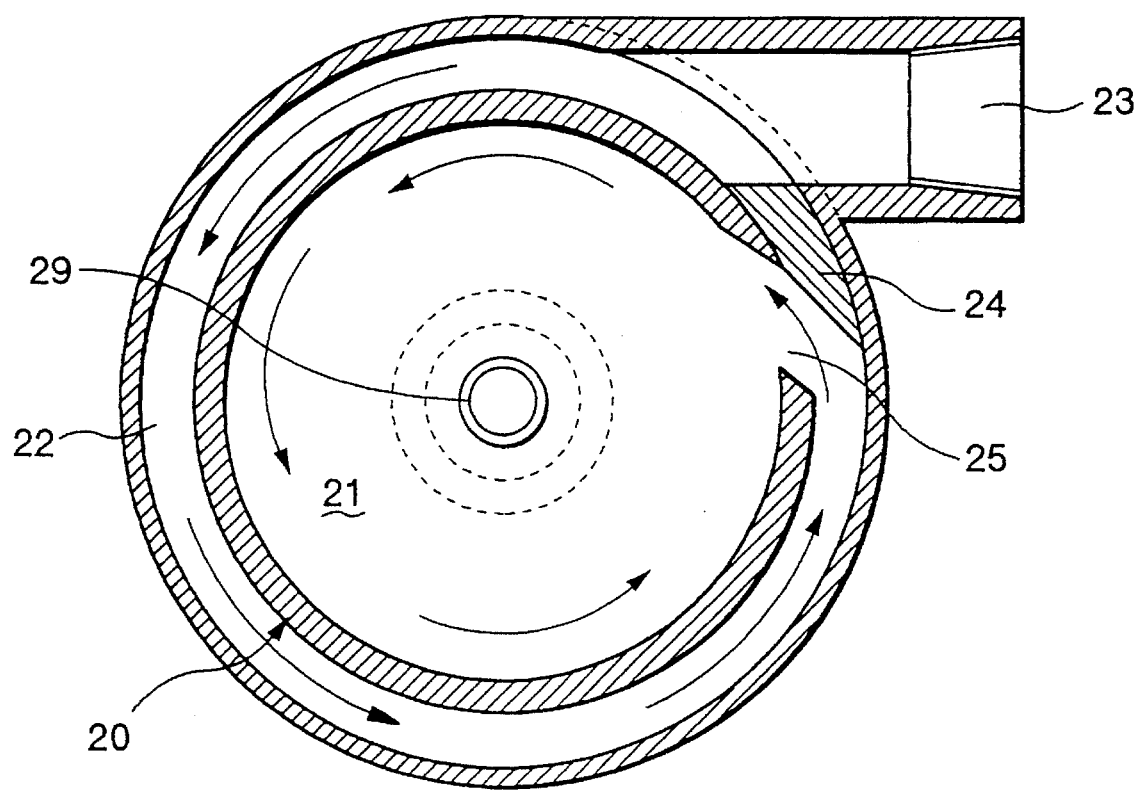
FIG. 3 is a sectional plan view taken along line I—I in FIG. 2.

FIGS. 2 and 3 show the first embodiment of a bubble separating apparatus according to the present invention. As shown in these figures, a vortical flow chamber 21 is defined in a cone-shaped container 20 having opposite closed ends. In the illustrated embodiment, the larger diameter end of the cone-shaped container 20 is the lower end. Around the lower end of the container 20, an annular preliminary vortical flow passage 22 is formed integrally with the container 20. The preliminary passage 22 communicates with a liquid supply inlet 23 at one end which will be hereinafter referred to as inlet side end. A flow guide member 24 is provided at the other end of the preliminary passage 22 positioned in the vicinity of the inlet side end, which other end of the preliminary passage will be hereafter referred to as outlet side end. The preliminary passage 22 communicates with the chamber 21 via a single opening 25 positioned at the outlet side end thereof. The flow guide member 24 has a flow guide surface extending substantially in a tangential direction to the inner periphery of the chamber 21 at the opening 25, so that the liquid is introduced into the chamber 21 from the preliminary passage 22 in a tangential direction.

The container 20 has a plurality of small holes 26 formed through the peripheral wall in substantially an upper half of the container. The container 20 is disposed in an outer vessel 27 so that the liquid discharged through the small holes 26 is received within the outer vessel 27. The outer vessel 27 is formed integrally with the container 20 and the preliminary passage 22. The liquid received in the outer vessel 27 is discharged through a liquid discharge outlet 28.

On the other hand, along the center axis of the chamber 21 in the container 20, a center conduit pipe 29 is disposed. The center conduit pipe 29 is formed with a plurality of orifices 30 for connecting the interior space of the center conduit pipe and the chamber 21. The lower end of the center conduit pipe 29 is extended through the lower end of the container 20 and the bottom of the outer vessel 27. The center conduit pipe 29 is adapted to capture fine bubbles concentrated toward the center portion of the chamber 21 by centrifugal force exerted due to vortical flow of the liquid within the chamber 21. The liquid containing concentrated bubbles flowing into the center conduit pipe 29 through the orifices 30 is fed to a bubble discharge outlet 31.

The liquid is pressurized by means of a pump and introduced through the liquid supply inlet 23 into the preliminary passage 22. Then, the liquid flows through the preliminary passage 22 to reach its outlet side end. The inlet side end and outlet side end of the preliminary passage 22 are located in close proximity to each other, so that the liquid in the preliminary passage 22 flows substantially the entire circumference of the container 20. During this travel, since the liquid flows substantially in a circumferential direction, it is subject to centrifugal force. Due to a difference in density, a fraction of the liquid containing bubbles accumulates at the inner portion of the preliminary passage 22 and flows substantially along the inner wall defining the passage 22. On the other hand, the fraction of liquid having high density and thus having less bubbles concentrically flows substantially along the outer wall of the preliminary passage 22. Therefore, preliminary bubble-liquid separation can take place within the preliminary passage 22 to form laminar flows of a high density liquid fraction containing less bubbles and a low density fraction containing concentrated bubbles. Furthermore, concentration of the bubble containing fraction of the liquid adjacent the inner portion of the preliminary passage 22 causes mutual collision of bubbles whereby a plurality of fine bubbles are combined or united together to form greater size bubbles. Thus, during flow in the preliminary passage 22, size of the bubbles can be enlarged.

The liquid reaching the outlet side end of the preliminary passage 22 is guided by the flow guide member 24 and deflected into the chamber 21. As set forth above, since the guide surface of the member 24 extends substantially in a tangential direction to the inner periphery of the chamber at the edge facing the opening 25, the flow guide member 24 does not substantially affect the flow of the liquid. Therefore, the liquid is introduced into the chamber 21 without causing any noticeable deceleration of the flow velocity while maintaining laminar flows of the fractions. Since the flow velocity is substantially maintained without any noticeable deceleration upon introduction into the chamber 21, and since the liquid is introduced in a tangential direction through the single opening 25, strong vortical flow can be generated in the chamber 21.

The chamber 21 serves as a kind of cyclone to cause acceleration of the vortical flow velocity toward the narrower upper end, and the bubble containing fraction of the liquid is further concentrated into the vortex center to cause further combination of a plurality of bubbles to form further greater size bubbles. Accordingly, the low density fraction of the liquid containing concentrated bubbles can be efficiently removed and discharged through the center conduit pipe 29. On the other hand, the high density fraction of the liquid containing substantially no bubble flows into the vessel 27 via the small holes 26 to be discharged through the discharge outlet 28.

Figure 1:
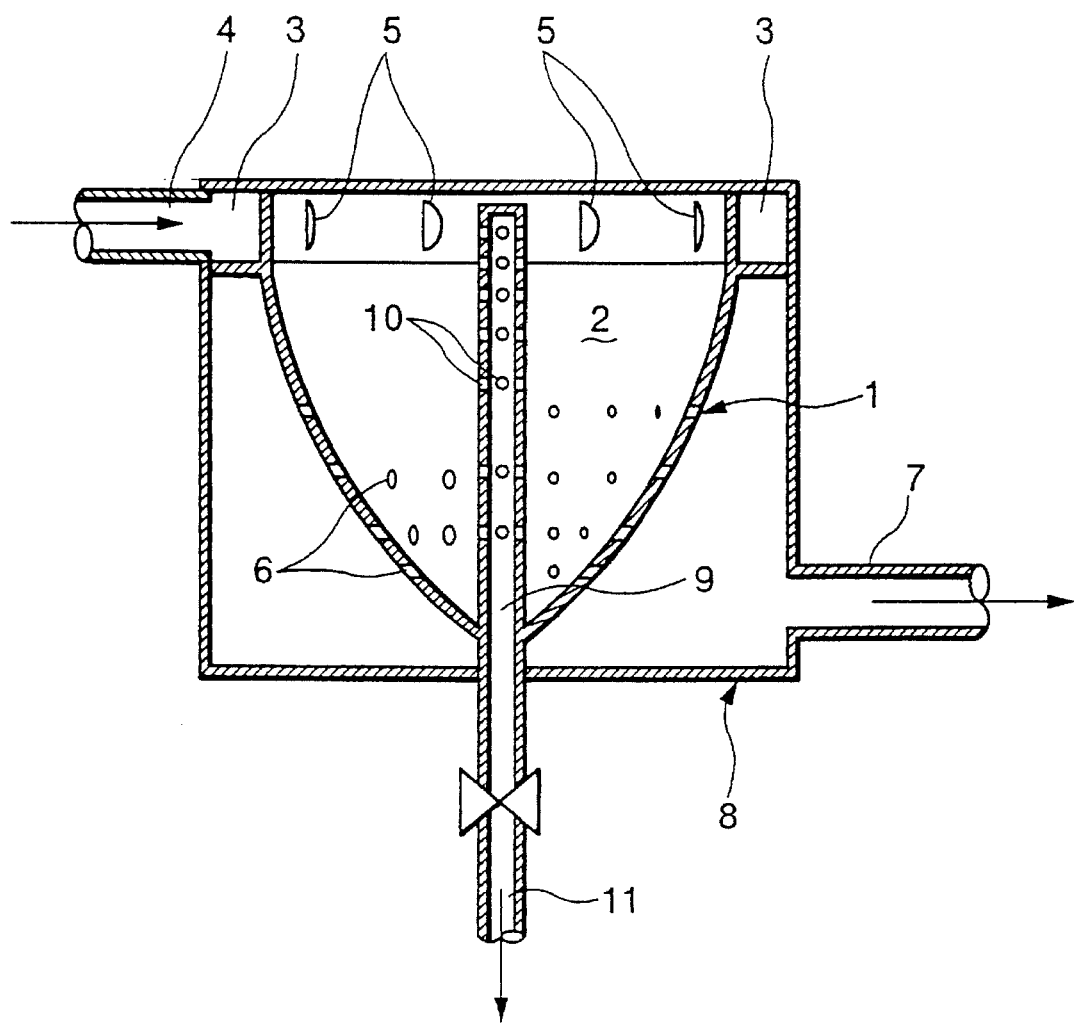
FIG. 1 is a sectional front elevation of a known bubble separating apparatus.

In order to demonstrate performance of the shown embodiment, comparative tests were undertaken. For testing, the bubble containing liquid is prepared by injecting through a fine nozzle high pressure air into the hydraulic oil which is being agitated at high speed. As a result, fine bubbles of approximately 100 μm diameter were generated in the hydraulic oil. The bubble content was approximately 10% by volume. The liquid thus prepared was pressurized by a pump and supplied to both of the first embodiment of the bubble separating apparatus and the prior art apparatus of FIG. 1 for comparing the degree of removal of the bubbles. The bubble removal ratio is derived through the following equation. It should be noted that bubble content was measured employing a device disclosed in Japanese Unexamined Patent Publication (Kokai) No. 4-172230. The disclosure of the above-identified publication is herein incorporated by reference.

$$B_r = \frac{B_s - B_d}{(B_s)} \times 100$$

where

Br: bubble removal rate (vol. %)
Bs: bubble content in supply oil (vol. %)
Bd: bubble content in discharged oil (vol. %)

The results of the test shown in the following table 1:

TABLE 1

| | Bubble Content (vol. %) | | Bubble Removal Rate |
|---|---|---|---|
| | Supply | Discharged | (vol. %) |
| Invention | 10.0 | 1.0 | 90 |
| Prior Art | 10.3 | 2.3 | 78 |

The discharge oil in the table 1 was supplied to a hydraulic device, and a hydraulic pressure generated in the hydraulic device was measured for determining the influence of bubbles in the hydraulic oil. It should be noted that measurement of the hydraulic pressure was performed at the discharge side of a high pressure pump incorporated in the hydraulic device.

As a result of tests, when the discharged oil from the apparatus of the present invention was supplied, the hydraulic pressure was 104 kg/cm$^2$, and when the discharged oil from the prior art device was supplied, the hydraulic pressure was 101 kg/cm$^2$. On the other hand, when the bubble separating apparatus is not used, the pressure of the hydraulic oil (of which bubble content was approximately 10% by volume) was 92 kg/cm$^2$.

As can be appreciated herefrom, lesser bubble content, namely higher bubble removal rate, may result in higher hydraulic pressure for higher working efficiency of the hydraulic device.

Figure 4:
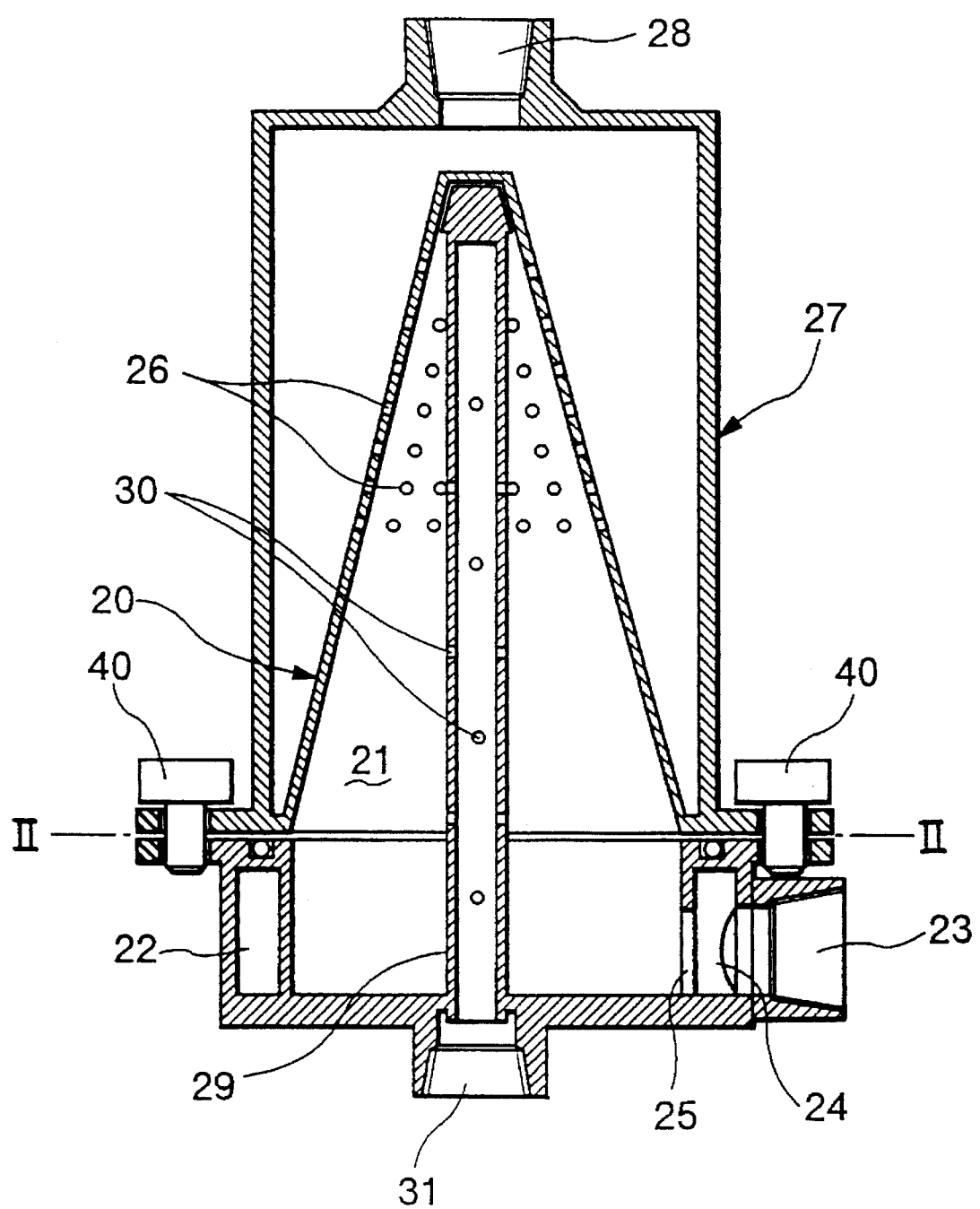
FIG. 4 is a sectional front elevation of the second embodiment of a bubble separating apparatus according to the present invention.

FIG. 4 shows the second embodiment of the bubble separating apparatus according to the present invention. The shown embodiment of the apparatus has a construction divided into two segments at a portion indicated by line II—II and fastened by bolts 40. Other construction is the same as the first embodiment and need not be discussed in detail again. The shown construction is advantageous in facilitating cleaning and maintenance of the apparatus by permitting separation into two segments.

As set forth above, since the shown embodiments provide the liquid supply passage acting as the preliminary passage extending along substantially the entire circumference of the container 21, the high density fraction and bubble containing low density fraction of the liquid can be separated to form laminar flows by the action of centrifugal force during travel through the preliminary passage. Furthermore, the bubbles are concentrated in the vicinity of the inner wall defining the passage and collide to each other to cause combination for forming greater size bubbles. In addition, since the liquid passes through the preliminary passage into the chamber through a single opening, disturbance of the liquid flow can be minimized so that the liquid can be introduced into the chamber while maintaining sufficient flow energy. This enables a vortical flow strong enough for efficiently removing the bubbles to be generated.

Figure 5:
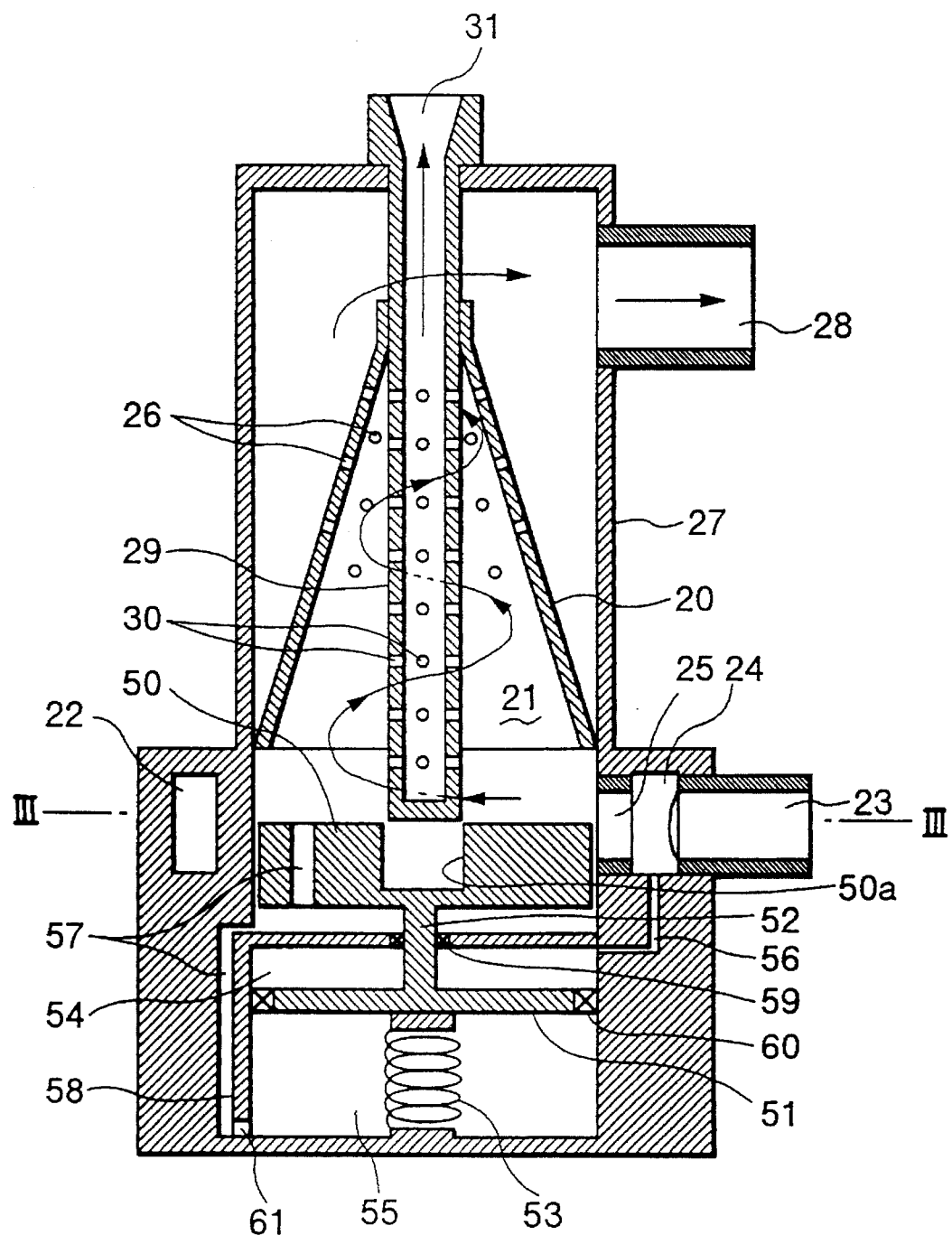
FIG. 5 is a sectional front elevation of the third embodiment of a bubble separating apparatus according to the invention.
Figure 6:
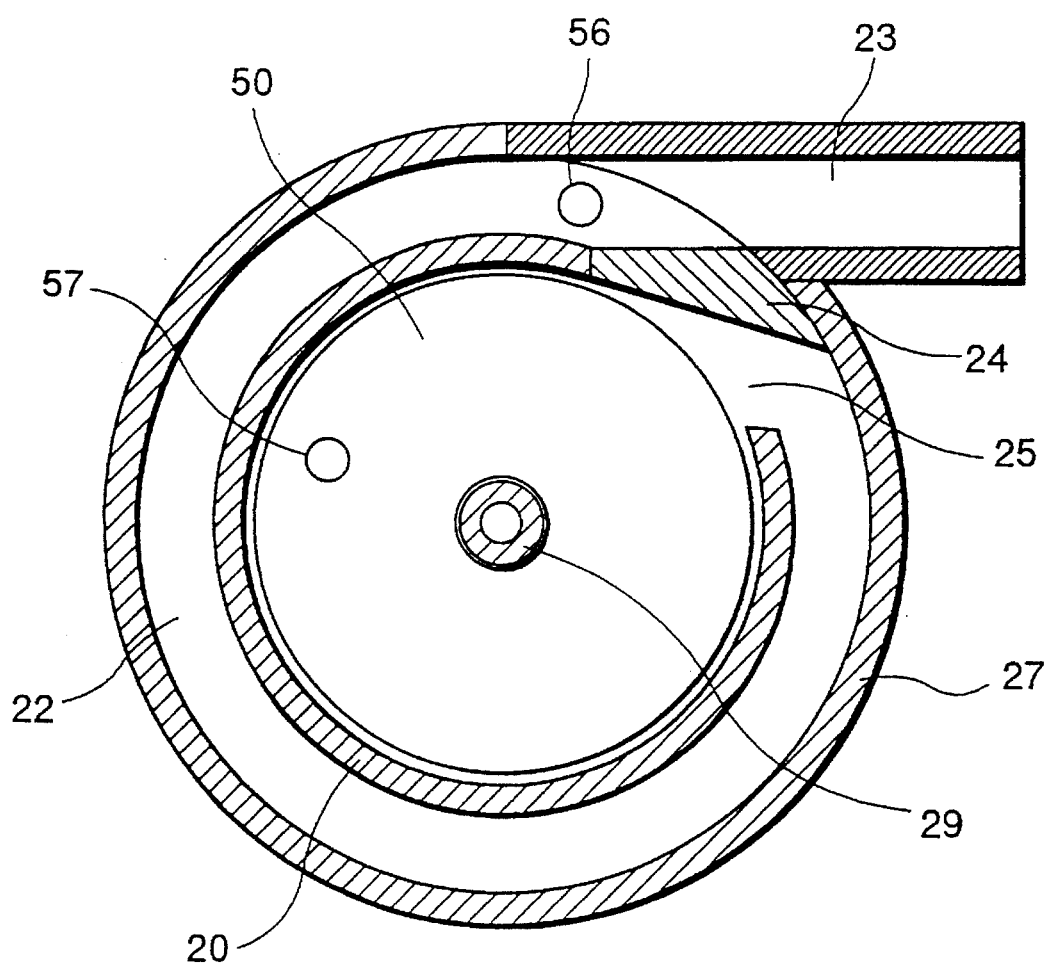
FIG. 6 is a section taken along line III—III of FIG. 5.

FIG. 5 shows a third embodiment of the bubble separating apparatus according to the present invention. In the following disclosure, the like reference numerals to the former embodiment represent like elements. The embodiment illustrated in FIG. 5 provides liquid flow rate regulation for further enhancing or optimizing bubble separating performance of the apparatus according to the present invention. Namely, as set forth in the introductory part of the disclosure, it is essential for the vortical flow type bubble separating apparatus to generate a strong vortical flow for efficiently removing bubbles from the liquid. For generating strong vortical flow, liquid flow velocity and angular velocity as introduced into the chamber are important. When the operation of the pump pressurizing the liquid fluctuates to vary the liquid flow rate, vortical flow condition in the chamber is inherently varied to cause variation of the bubble removal performance. Namely, when the liquid flow rate is smaller than a design flow rate, at which the bubble separation performance is optimized, the liquid flow velocity and angular velocity become lower, resulting in a reduced vortical flow energy. Then, the centrifugal force for separating the high density bubble-eliminated fraction and the low density bubble-containing fraction becomes insufficient. On the other hand, when the liquid flow rate is excessively large, the vortical flow velocity of the liquid in the chamber becomes excessively high, the dwell time, in which the liquid stays in the chamber, becomes too short to successfully separate the bubble containing fraction. Therefore, it is desirable to regulate the liquid flow velocity and angular velocity as introduced into the chamber.

For this purpose, the embodiment illustrated in FIG. 5 incorporates a liquid supply regulation mechanism arranged within the outer vessel 27 below the chamber 21. The liquid supply regulation mechanism comprises a plunger 50, a piston 51, a piston rod 52 connecting the plunger 50 and the piston 51, a spring 53 provided between the bottom of the apparatus and the bottom of the piston 51 for providing upward bias force for the piston, a pilot pressure chamber 54, a reference pressure chamber 55, a pilot pressure conduit 56 for introducing the pressure in the preliminary passage 22 in the vicinity of the liquid supply inlet 23, and a reference pressure introduction passage 57.

The plunger 50 has a diameter substantially corresponding to the lower larger diameter end of the container 20 for substantially closing that end. Also, the plunger 50 is formed to have a thickness necessary for at least partially blocking the opening 25. The plunger 50 moves reciprocally according to the action of the piston 51 for varying the flow path area of the opening 25. The upper end plane of the plunger 50 defines the bottom of the chamber 21 and has formed in the center portion thereof a recess 50a for accommodating the lower end of the center conduit pipe 29 when the plunger is shifted upwardly.

The reference pressure introduction passage 57 extends through the plunger 50 in the vicinity of its circumference and further extends between the wall of the outer vessel 27 and a partitioning wall 58. This passage 57 communicates with the reference pressure chamber 55 which is defined by the partitioning wall 58, the piston 51 and the bottom wall of the outer vessel 27, through a communication path 61 formed at the lower end of the partitioning wall 58.

On the other hand, the pilot pressure conduit 56 extends between the preliminary passage 22 in the vicinity of the inlet side end (see FIG. 6) and the pilot pressure chamber 54 which is defined by the partitioning wall 58, the piston 51 and the wall of the outer vessel 27 for liquid communication therebetween. The piston 51 carries a sealing packing 60 on the outer periphery thereof for establishing a liquid tight seal to thereby separate the pilot pressure chamber 54 and the reference pressure chamber 55. The piston rod 52 connecting the piston 51 and the plunger 50 is sealed with an annular packing 59 for blocking liquid communication between the reference pressure introduction passage 57 and the pilot pressure chamber 54.

With the construction set forth above, the supply pressure of the liquid at the preliminary passage 22 is introduced into the pilot pressure chamber 54 as a pilot pressure, through the pilot pressure conduit 56. On the other hand, the pressure in the chamber 21 is introduced into the reference pressure chamber 55 as a reference pressure. Therefore, upward force is exerted on the piston 51 as a composite force of the reference pressure in the reference pressure chamber 55 and the spring force of the spring 53. On the other hand, downward force is exerted on the piston 51 by the pilot pressure in the pilot pressure chamber 54. The piston 51 is thus located at a position where the force balance at both sides is established. Namely, at the piston position where the force balance is established, the pressures at the liquid supply inlet 23 and the chamber 21 are differentiated in a magnitude corresponding to the set force given by the spring 53.

When the supply pressure at the liquid supply inlet 23 is lowered due to a lowering of the flow rate, the pressure in the pilot pressure chamber 54 is lowered accordingly to destroy the force balance. This results in upward movement of the piston 51. The upward movement of the piston 51 causes upward movement of the plunger 50 to reduce the liquid flow path area at the opening 25 as well as the volume of the chamber 21. Greater liquid flow restriction thus provided causes acceleration of the flow velocity of the liquid introduced into the chamber 21. Also, the reduced volume of the chamber 21 maintains the flow velocity necessary for the centrifugal separation. On the other hand, when the supply pressure at the liquid inlet 23 is increased due to an increase of the flow rate, the increased pressure may overcome the composite force of the reference pressure corresponding to the pressure in the chamber 21 and the spring force of the spring 53 to lower the piston 51 together with the plunger 50. Accordingly, the liquid flow path area at the inlet opening 25 as well as the volume of the chamber 21 is increased to lower the liquid pressure as introduced into the chamber. In this way, the liquid pressure as introduced into the chamber 21 can be regulated to regulate the angular velocity of the vortical flow of the liquid. Consequently, by appropriately adjusting the set force provided by the spring 53, the flow velocity and angular velocity of the liquid can be optimized for optimizing bubble removal performance.

It should be appreciated that while the foregoing embodiment employs a pressure difference responsive piston and plunger assembly for adjusting the liquid flow path area for regulating the liquid flow velocity as introduced into the chamber, it may be possible to achieve a similar effect by electrically controlling the position of the plunger and taking the pressures at the liquid supply inlet 23 and the chamber 21 as controlling parameters.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A vortical flow type bubble separating apparatus comprising:

a container having a circular cross-section, a predetermined axial length and closed axial ends, said container defining a substantially cone-shaped vortical flow chamber having a lower larger diameter end;

a plurality of holes formed in a predetermined region in the vicinity of the upper half of the peripheral wall of said container for discharging a reduced bubble fraction of a liquid from said vortical flow chamber;

an outer casing surrounding said container and receiving the liquid discharged from said vortical flow chamber through said holes for guiding the received liquid to an outlet;

a center conduit pipe disposed within said vortical flow chamber and extending substantially along the center axis of said vortical flow chamber;

a plurality of orifices formed through said center conduit pipe within said chamber for removing a bubble containing fraction from said vortical flow chamber for discharging;

an annular preliminary vortical flow passage substantially surrounded by solid walls and extending substantially the entire circumference of the larger diameter end portion of said container, said preliminary vortical flow passage being separated from said vortical flow chamber by said peripheral wall of said container;

a single opening defined through said peripheral wall of said vortical flow chamber and providing communication between said vortical flow chamber and said preliminary vortical flow passage, said opening being provided at a substantially downstream end of said preliminary vortical flow passage, and said opening being designed for introducing the liquid into said vortical flow chamber from said preliminary vortical flow passage in a substantially tangential direction to said vortical flow chamber; and a flow guide member provided at the end of said preliminary vortical flow passage in the vicinity of said opening for guiding liquid flow into said vortical flow chamber with little angular deflection.

2. An apparatus as set forth in claim 1, further comprising a liquid supply regulation mechanism responsive to a pressure difference between a liquid pressure at an inlet of said preliminary vortical flow passage and a liquid pressure in said vortical flow chamber for regulating a flow velocity of the liquid as introduced into said vortical flow chamber.

3. An apparatus as set forth in claim 2, wherein said liquid supply regulation mechanism comprises a member movable relative to said single opening for restricting a liquid flow area thereof and thereby adjusting the liquid flow area depending upon the pressure difference between said vortical flow chamber and said inlet of said preliminary vortical flow passage in order to regulate flow velocity of the liquid introduced into said vortical flow chamber.

4. An apparatus as set forth in claim 3, wherein said movable member substantially defines a bottom of said vortical flow chamber.

5. An apparatus as set forth in claim 4, wherein said movable member comprises a plunger formed to have a thickness for at least partially blocking said single opening.

6. An apparatus as set forth in claim 3, wherein said liquid supply regulation mechanism further comprises a pilot pressure chamber communicating with said preliminary vortical flow passage in the vicinity of an inlet side end thereof, a reference pressure chamber communicating with said vortical flow chamber and separated from said pilot pressure chamber in a liquid tight manner, and a piston positioned between said pilot pressure chamber and said reference pressure chamber and connected to said movable member, said piston being adapted to move in response to a pressure difference between said pilot pressure chamber and said reference pressure chamber.

7. An apparatus as set forth in claim 6, wherein said liquid supply regulation mechanism further comprises a spring means for normally urging said piston.

8. An apparatus as set forth in claim 6, wherein said pilot pressure chamber and said reference pressure chamber are defined within said outer casing.

9. An apparatus as set forth in claim 1, wherein said container, said outer casing and said annular preliminary vortical flow passage are integrated.

10. An apparatus as set forth in claim 1, wherein said preliminary vortical flow passage is connected to a pressurized liquid source for introducing a pressurized liquid in a substantially tangential direction.

11. A vortical flow type bubble separating apparatus comprising:
- a cyclone generating a vortical flow of a liquid for separating bubbles contained in the liquid by centrifugally concentrating a first fraction of the liquid containing substantially no bubble and a second fraction of the liquid containing concentrated bubbles, said cyclone having a plurality of holes formed through a peripheral wall thereof for discharging said first fraction of the liquid therethrough and an inlet for introducing a pressurized liquid therethrough;
- an induction assembly communicating at one end thereof with said inlet of said cyclone and at the other end thereof with a pressurized liquid source for introducing the pressurized liquid into said cyclone therethrough, said induction assembly incorporating means for exerting a centrifugal force on the liquid flowing therethrough for preliminarily separating said first and second fractions of said liquid and forming laminar flows of said respective fractions, and means for guiding said laminar flows of the liquid toward said inlet with little angular deflection to introduce the liquid as tangential flow at said inlet of said cyclone, said means for preliminarily separating said first and second fractions of said liquid comprising a passage portion substantially surrounded by solid walls and extending substantially the entire circumference of said cyclone and separated therefrom by a wall defining said cyclone, said passage portion having a single outlet communicating with said inlet of said cyclone and located at a substantially downstream end of said passage portion;
- a center conduit means disposed in said cyclone and extending substantially along the center axis of said cyclone, said center conduit means having a plurality of orifices for removing said second fraction of the liquid and discharging it; and
- an outer casing surrounding said cyclone for receiving said first fraction of the liquid discharged through said holes of the peripheral wall of said cyclone, said outer casing having an outlet for discharging said first fraction of the liquid.

12. An apparatus as set forth in claim 11, wherein said induction assembly has an inlet connected to said pressurized liquid source via a supply line, said outlet communicating with said cyclone, said inlet and said supply line being connected to orient the liquid substantially tangentially with respect to said inlet of said induction assembly.

13. An apparatus as set forth in claim 11, further comprising a liquid flow velocity regulating means responsive to a pressure difference between the cyclone and said inlet of said induction assembly connected to said pressurized liquid source.

14. An apparatus as set forth in claim 13, wherein said liquid flow velocity regulating means comprises a member movable with respect to said inlet of said cyclone for varying a liquid path area depending upon the pressure difference between said cyclone and said inlet of said induction assembly.

15. An apparatus as set forth in claim 14, wherein said movable member substantially defines a bottom of said cyclone.

16. An apparatus as set forth in claim 15, wherein said movable member comprises a plunger formed to have a thickness for at least partially blocking said inlet of said cyclone.

17. An apparatus as set forth in claim 14, wherein said liquid flow velocity regulating means further comprises a pilot pressure chamber communicated with said induction assembly in the vicinity of said other end thereof, a reference pressure chamber communicated with said cyclone and separated from said pilot pressure chamber in a liquid tight manner, and a piston positioned between said pilot pressure chamber and said reference pressure chamber and connected to said movable member, said piston being adapted to move in response to a pressure difference between said pilot pressure chamber and said reference pressure chamber.

18. An apparatus as set forth in claim 17, wherein said liquid flow velocity regulating means further comprises a spring means for normally urging said piston.

19. An apparatus as set forth in claim 17, wherein said pilot pressure chamber and said reference pressure chamber are defined within said outer casing.

* * * * *